United States Patent
Jadeborg et al.

(10) Patent No.: US 11,820,235 B2
(45) Date of Patent: Nov. 21, 2023

(54) METHOD AND ARRANGEMENT FOR PROTECTION OF ACCESS TO LIVE PARTS WHEN CHARGING HYBRID OR ELECTRIFIED VEHICLES

(71) Applicant: Scania CV AB, Södertälje (SE)

(72) Inventors: Robert Jadeborg, Södertälje (SE); Gunnar Ledfelt, Nykvarn (SE)

(73) Assignee: Scania CV AB, Södertälje (SE)

( * ) Notice: Subject to any disclaimer, the term of this patent is extended or adjusted under 35 U.S.C. 154(b) by 342 days.

(21) Appl. No.: 17/413,163

(22) PCT Filed: Dec. 18, 2019

(86) PCT No.: PCT/SE2019/051304
§ 371 (c)(1),
(2) Date: Jun. 11, 2021

(87) PCT Pub. No.: WO2020/130919
PCT Pub. Date: Jun. 25, 2020

(65) Prior Publication Data
US 2022/0048395 A1 Feb. 17, 2022

(30) Foreign Application Priority Data

Dec. 19, 2018 (SE) .................................... 1851608-8

(51) Int. Cl.
*B60L 53/16* (2019.01)
*H02J 7/00* (2006.01)

(52) U.S. Cl.
CPC ............ *B60L 53/16* (2019.02); *H02J 7/0036* (2013.01)

(58) Field of Classification Search
CPC ................................ B60L 53/16; H02J 7/0036
(Continued)

(56) References Cited

U.S. PATENT DOCUMENTS 8,335,062 B2 * 12/2012 Haines ................... H02H 5/105
320/109
8,917,054 B2 * 12/2014 Acena ..................... B60L 53/60
320/136
(Continued)

FOREIGN PATENT DOCUMENTS

DE 102009052366 A1 7/2010
DE 102012020409 A1 4/2014
(Continued)

OTHER PUBLICATIONS

Scania CV AB, International Patent Application No. PCT/SE2019/051304, International Preliminary Report on Patentability, dated Jun. 16, 2021.
(Continued)

*Primary Examiner* — Suresh Memula
(74) *Attorney, Agent, or Firm* — Moore & Van Allen PLLC; W. Kevin Ransom (57) ABSTRACT

An arrangement for preventing access to live parts in charging contact sockets of a hybrid or electrified vehicle having a plurality of such sockets each connectable to an external source of electric energy through a switch in an electric vehicle supply equipment station by inserting an electric plug in a socket for providing electric energy to batteries comprises blind plugs insertable into the sockets and the sockets are connected to each other and the batteries. A device is configured to sense presence of either an electric plug or a blind plug in each socket and the switch will be closed under the condition that either an electric plug or a blind plug is sensed by the device for all sockets and at least one of these plugs is an electric plug.

17 Claims, 7 Drawing Sheets

(58) Field of Classification Search
USPC .......................................................... 320/107
See application file for complete search history.

(56) References Cited

U.S. PATENT DOCUMENTS

| | | | |
|---|---|---|---|
| 10,535,940 B2 | 1/2020 | Fuehrer et al. | |
| 2009/0286414 A1 | 11/2009 | Ohtomo | |
| 2010/0320964 A1 | 12/2010 | Lathrop et al. | |
| 2014/0002020 A1* | 1/2014 | Geber .................... | B60L 53/30 320/109 |
| 2014/0167695 A1* | 6/2014 | Shimizu .................. | B60L 53/30 439/304 |
| 2014/0285209 A1 | 9/2014 | Stichowski et al. | |
| 2015/0034400 A1* | 2/2015 | Amano ................... | B60L 50/66 180/65.8 |
| 2015/0048804 A1* | 2/2015 | Toivanen .............. | H02J 7/0036 320/162 |
| 2015/0097525 A1* | 4/2015 | DeDona .................. | B60L 1/006 320/109 |
| 2015/0239359 A1* | 8/2015 | Sasaki .................... | B60L 53/16 320/109 |
| 2016/0039298 A1* | 2/2016 | Herzog ................... | B60L 53/30 320/109 |
| 2023/0128750 A1* | 4/2023 | Shimogaki ............ | H02J 7/0047 320/109 |

FOREIGN PATENT DOCUMENTS

| | | | | |
|---|---|---|---|---|
| DE | 102015004119 A1 | | 10/2016 | |
| EP | 2865559 A2 | * | 4/2015 | ............. B60K 15/05 |
| EP | 2865559 A2 | | 4/2015 | |
| EP | 3309908 A2 | | 4/2018 | |
| EP | 3402007 A1 | | 11/2018 | |
| WO | 2012034638 A1 | | 3/2012 | |
| WO | 2017162495 A1 | | 9/2017 | |
| WO | WO-2017162495 A1 | * | 9/2017 | ............. B60L 53/16 |

OTHER PUBLICATIONS

Scania CV AB, European Patent Application No. 19899100.2, Extended European Search Report, dated Aug. 4, 2022.
Scania CV AB, International Patent Application No. PCT/SE2019/051304, International Search Report, dated Jan. 29, 2020.
Scania CV AB, International Patent Application No. PCT/SE2019/051304, Written Opinion, dated Jan. 29, 2020.
Scania CV AB, Swedish Patent Application No. 1851608-8, Office Action, dated Jul. 1, 2019.

* cited by examiner

METHOD AND ARRANGEMENT FOR PROTECTION OF ACCESS TO LIVE PARTS WHEN CHARGING HYBRID OR ELECTRIFIED VEHICLES

CROSS-REFERENCE TO RELATED APPLICATIONS

This application is a National Stage patent application (filed under 35 § U.S.C. 371) of PCT/SE2019/051304, filed Dec. 18, 2019 of the same title, which, in turn claims priority to Swedish Patent Application No. 1851608-8 filed Dec. 19, 2018 of the same title; the contents of each of which are hereby incorporated by reference.

FIELD OF THE INVENTION

The present invention relates to a method for preventing access to live parts in charging contact sockets of a hybrid or electrified vehicle having a plurality of such sockets each connectable to an external source of electric energy through a switch in an electric vehicle supply equipment (EVSE) station by inserting an electric plug in the socket for providing electric energy to batteries of the vehicle, in which a blind plug is insertable in each said socket, said sockets being connected to each other and to said batteries, as well as an arrangement for preventing access to live parts in charging contact sockets according to the preamble of the appended independent arrangement claim.

Hybrid and electrified vehicles will through a so-called electric vehicle supply equipment (EVSE) station be connected to AC or DC mains grid for slow charging at rest, which often is over night. In some cases there might be a need for double charging contact sockets in the vehicle body due to different circumstances and requirements from the users of the vehicles. This is especially the case for longer vehicles, such as buses and trucks for which it may be convenient to change charging contact socket due to different possibilities to parking or even charge the electric batteries of the vehicle through more than one such socket simultaneously. However, all types of hybrid or electrified vehicles are comprised. Furthermore, the number of charging contact sockets may be higher than two.

When inserting an electric plug connected through a cable to an EVSE in a charging contact socket of the vehicle a control unit in the vehicle sends a signal to the EVSE to inform about the connection and the switch in the EVSE will then be closed for connection of the batteries to an external source of electric energy, such as an AC or DC mains grid. There are standards, e.g. IEC 61851, describing how batteries of a vehicle is charged in this way. However, the invention is not restricted to any particular such standard. Since the sockets of the vehicle are connected to each other and to the batteries the socket or sockets not connected to the EVSE by having an electric plug inserted therein will be "electrified" from the socket connected thereto through the internal cable/components interconnecting the sockets. It would be dangerous to people and products to touch live parts in the socket making it essential to prevent access thereof by introducing safety protection in addition to a touch protection of pins in the sockets normally there.

BACKGROUND OF THE INVENTION

DE 102009052366 discloses a hybrid vehicle having two said sockets for connecting cables for charging batteries of the vehicle. It is tried to address the problem mentioned above by having a lid covering each socket and providing each lid with a lock for locking a lid when the other lid is opened avoiding the use of both sockets simultaneously.

SUMMARY OF THE INVENTION

The object of the present invention is to provide a method and an arrangement according to the introduction being improved in at least some aspect with respect to such methods and arrangements already known.

This object is with respect to the method obtained by providing such a method with the features listed in the characterizing part of appended patent claim 1.

Accordingly, when electric energy is to be provided to the battery charger for charging of electric batteries of the vehicle after having inserted an electric plug in at least one of the charging contact sockets of the vehicle, it is in a step a) sensed, for each said socket, to detect whether a said electric plug or a blind plug is received therein, and in a step b) the switch in the electric vehicle supply equipment station is controlled to be transferred to the closed position, under the condition that it has in said sensing been detected that all said sockets have either a said electric plug or a said blind plug received therein and at least one of these plugs is a said electric plug, to connect the batteries to the external electric energy source. This means that access to live parts in charging contact sockets is safely prevented, since connection of the batteries to the external electric energy source by closing the switch in the EVSE station may only take place if an electric plug is inserted in at least one of the charging contact sockets and the other such sockets are occupied. Thus, if an electric plug is inserted into a charging contact socket of the vehicle and another socket has no plug inserted therein a sensing action will detect this and no ok signal will be sent to the EVSE station for closing the switch. The invention is based on the use of blind plugs and the possibility to detect also that a blind plug is received in a charging contact socket when this is the case. "Controlling" as used in claim 1 comprises sending of information in the form of a signal to said station telling the station that a connection to an external electric energy source may be established. The method according to the invention is highly reliable and may be carried out by the use of simple means.

According to an embodiment of the invention the method comprises a further step c) carried out before or simultaneously with step b) and comprising locking of electric plugs and blind plugs received in the sockets thereto. Such locking before or at the same time as the batteries of the vehicle is connected to the external electric energy source will ensure that no electric plug or blind plug received in the socket may be removed once live parts are present in the sockets.

According to another embodiment of the invention the step c) is carried out upon detecting an electric plug received in a socket in step a).

According to another embodiment of the invention electric plugs and blind plugs received and locked in the sockets are kept locked thereto at least as longs as said switch is in the closed position and a transfer of the switch to the open position is required for disconnecting an electric plug received in a socket or removing a blind plug therefrom after providing said batteries with electric energy. Thus, a driver or another person has to control the station to transfer the switch into the open position before any plug may be removed from a socket on the vehicle. When driving the vehicle all sockets may be provided with a blind plug locked thereto and movable from the socket by a separate control of a person.

According to another embodiment of the invention electric plugs and blind plugs received and locked in the sockets are released therefrom by a transfer of the switch to the open position to enable removal of these plugs from the socket.

According to another embodiment of the invention it is in step a) sensed whether an electric plug is received in a socket by measuring a current possibly flowing in a first conducting loop to be closed by an electric plug or a blind plug received in the socket. By creating such a conducting loop through the plug received in the socket and by that generating a current in the loop of a certain magnitude when the plug is an electric plug it may be determined whether an electric plug is received in the socket.

According to another embodiment of the invention the same may be achieved for a blind plug received in the socket by sensing whether a blind plug is received in the socket by measuring the current possibly flowing in a second conducting loop to be closed by an electric plug or blind plug received in the socket.

According to another embodiment of the invention said conducting loop is closed at an open location separate from said socket for carrying out said sensing in step a). Such closing may then be carried out by shifting between closing said first loop and said second loop so as to alternatingly sense whether an electric plug or a blind plug is received in a socket.

The object of the invention is with respect to the arrangement obtained by providing an arrangement according to the introduction with the feature of comprising a device configured to sense presence of either an electric plug or a blind plug in each said contact and a control unit configured to receive information from said device about said sensing and to control said switch to assume a closed position under the condition that the presence of either a said electric plug or a said blind plug is sensed by the device for all said sockets of the vehicle and at least one of these plugs is a said electric plug and otherwise keep said switch in the open position.

According to an embodiment of the invention said device is configured to, for each said socket, alternatingly sense whether an electric plug or a blind plug is received therein and when either an electric plug or a blind plug is received therein send a logic 1 to an AND-gate included in the arrangement and having the output thereof connected to said control unit, and the control unit is configured to consider said condition fulfilled upon receiving a logic 1 from the output of said AND-gate.

The invention also relates to a computer program, a computer-readable medium, an electronic control unit and a hybrid or electrified vehicle having a plurality of charging contact sockets according to the appended claims directed thereto.

Further advantages as well as well as advantageous features of the invention will appear from the description following below.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
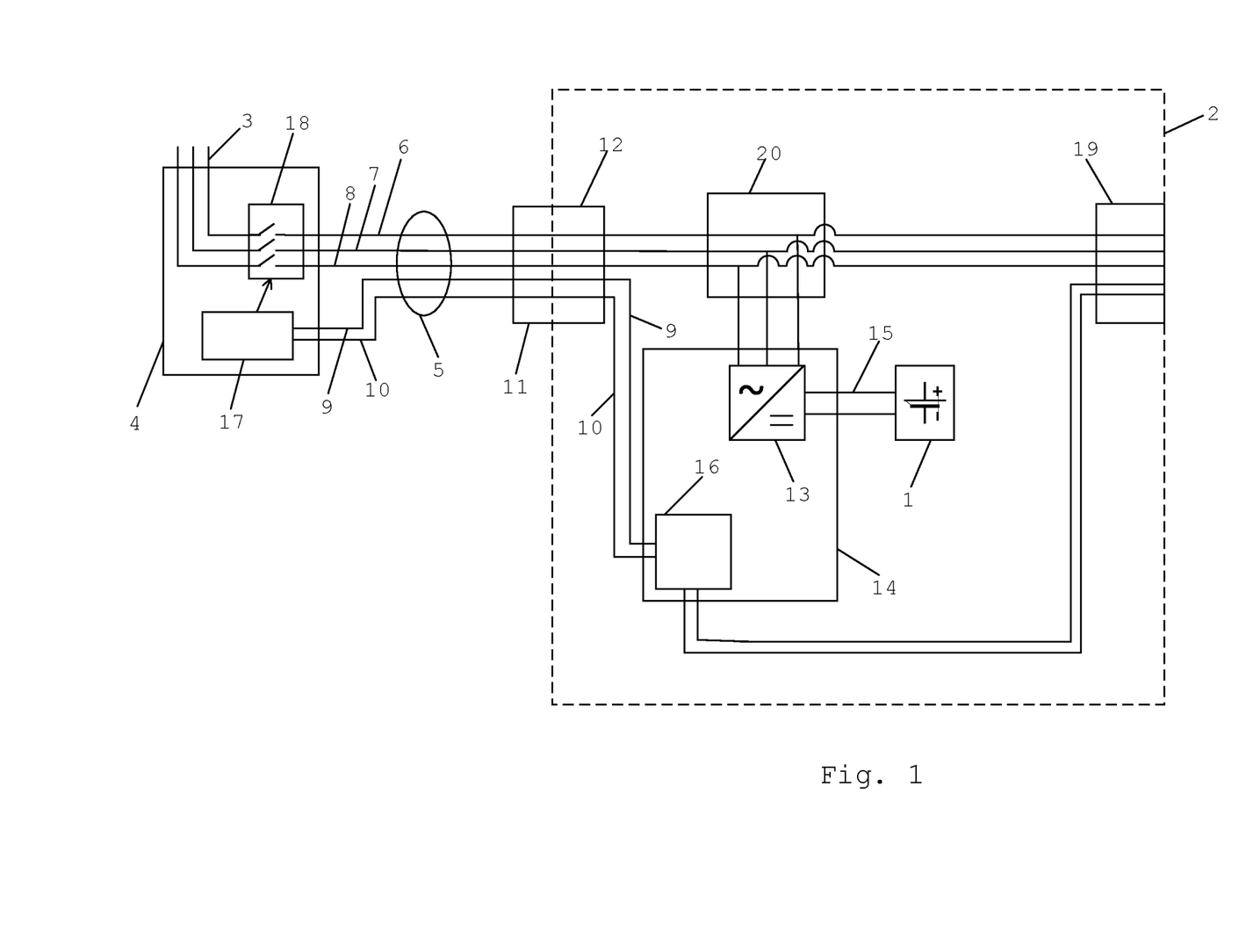
FIG. 1 is a very schematic view illustrating the general construction of an electric system to which arrangements according to the present invention for preventing access to live parts in charging contact sockets of a hybrid or electrified vehicle may be applied, in which for facilitating understanding charging from an AC mains grid is illustrated by omitting some parts connected to DC mains grid charging.

FIG. 1 illustrates very schematically how electric batteries 1 on board a hybrid or electrified vehicle 2 are charged by electric energy from an AC mains grid 3 connected to a charging station in the form of an electric vehicle supply equipment (EVSE) station 4. A cable 5 including the three AC phases 6-8 and two signal conductors 9, 10 (proximity pilot PP 9 and control pilot CP 10) has one end connected to the station 4 and the other end connected to an electric plug 11 insertable into a charging contact socket 12 arranged on the vehicle 2. It is shown how the AC phase lines 6-8 will through the introduction of an electric plug 11 into the socket 12 continue to a rectifier 13 included in an on board charger (OBC) 14 in the vehicle for feeding a DC current through a line 15 to the batteries 1 for charging thereof. It is shown how the on board charger 14 includes a first electronic control unit 16 to which the signal conductors 9, 10 are continued from the electric plug 11 to the socket 12 when the electric plug is inserted in the socket. These signal conductors are at the opposite end connected to a second electronic control unit 17 inside the EVSE station 4.

Furthermore, the EVSE station has a switch 18 through which the AC phases 6-8 of the cable 5 are connectable to the AC mains grid 3. The first control unit 16 in the on board charger 14 is configured to control the switch 18 by sending control signals on the signal conductors 9, 10 to the second control unit 17 to make this control unit to control the switch 18. Thus, when the first control unit 16 considers the conditions for starting charging of the batteries 1 fulfilled it will send information about this to the second control unit 17, which then controls the switch 18 to close. This may be described as a positive hand shake between the first electronic control unit 16 in the on board charger 14 and the second electronic control unit 17 of the EVSE station.

The method according to the present invention is directed to solving the problem of preventing access to live parts in charging contact sockets 12 of an electric system illustrated in FIG. 1 for a vehicle provided with a plurality of such sockets 12, such as one at the front and one at the rear of the vehicle, and it is here through dashed lines illustrated how the vehicle has further charging contact sockets 19 connected to the rectifier 13 and the first electronic control unit 16 of the on board charger 14 in the same way as the socket 12, and the phase lines from the two sockets are connected to each other in a junction box 20, which means when one socket is connected to an AC mains grid through an electric plug 11 the phase lines connected to the other socket will also be live. It is then of great importance that access to such live parts in a socket is prevented, and this is what the present invention is directed to achieve.

Figure 2:
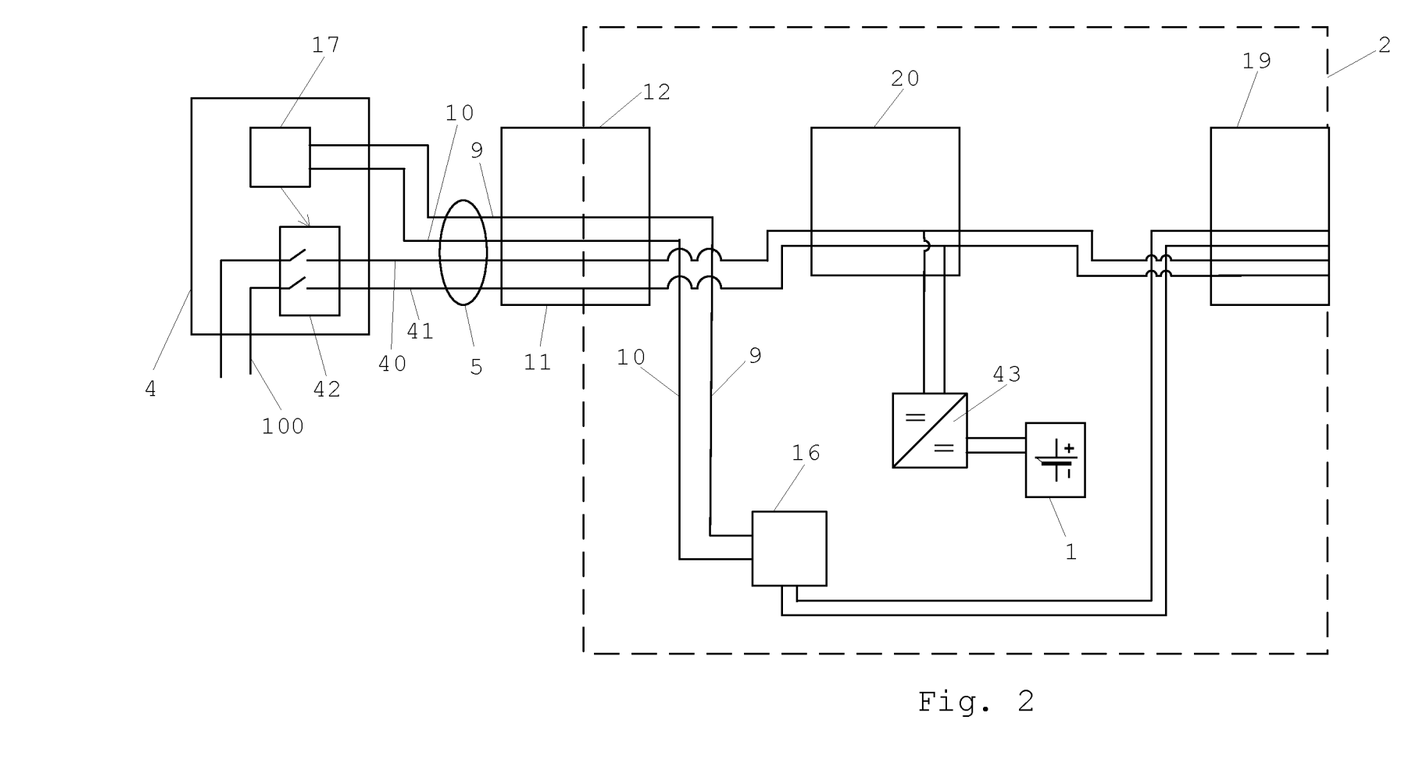
FIG. 2 is a view of the electric system shown in FIG. 1 used for DC mains grid charging.

FIG. 2 illustrates the same electric system as in FIG. 1 but in the case of charging the batteries from a DC mains grid 100. The parts also illustrated in FIG. 1 are provided with the same reference numbers as there. The cable from the station 4 does here include two DC conductors 40, 41 besides the two signal conductors 9, 10. Furthermore, it is shown how the EVSE station has a switch 42 through which the DC conductors are connectable to the DC mains grid 100. In case of DC charging a battery charger with rectifier is not necessary, but a DC/DC converter 43 is preferably connected between the DC conductors and the batteries 1 for voltage stabilization and obtaining galvanic isolation between the DC mains grid and the vehicle.

Figures 3, 4, 5:
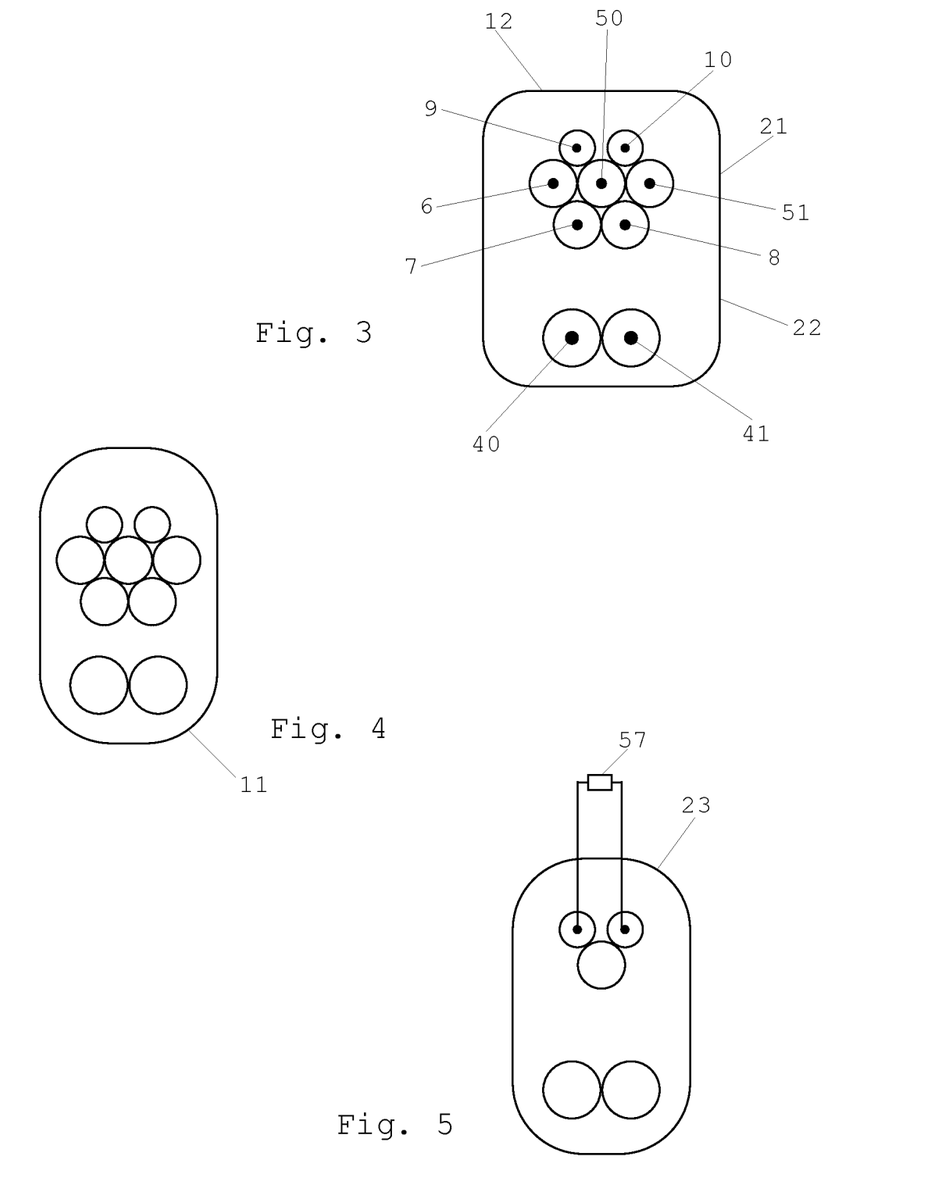
FIG. 3 is a schematic view illustrating a possible design of a charging contact socket arranged on a hybrid or electrified vehicle.
FIG. 4 is a view of an electric plug to be inserted in a socket according to FIG. 3 for providing electric energy to a battery charger of a vehicle.
FIG. 5 is a view of a blind plug insertable into a socket according to FIG. 3.

FIG. 3 illustrates a possible design of a charging contact socket 12 to be arranged on a hybrid or electrified vehicle, which has an upper part 21 for connection to an electric plug connected through an EVSE station to an external source of electric energy in the form of an AC mains grid and a lower part 22 for connection to a DC mains grid. The pins for the different phases and signal conductors have been provided with the same reference numerals as in FIG. 1. Pins for Protective Earth 50 and Neutral 51 are also present.

FIG. 4 illustrates an electric plug 11 designed to be inserted into the socket shown in FIG. 3 for connecting the pins thereof to the switch 18 of the EVSE station 4.

FIG. 5 illustrates a possible design of a blind plug 23 insertable into the socket shown in FIG. 3 for preventing access to live parts in said socket.

As already mentioned, the present invention is directed to solving the problem of preventing access to live parts in charging contact sockets of an electric system illustrated in FIG. 1. When charging of electric batteries in a hybrid or electrified vehicle is to take place by inserting an electric plug into a charging socket on the vehicle and controlling the switch in the electric vehicle supply equipment station to close and connect the battery charger to the AC or DC mains grid in question by connecting that socket and by that all sockets on the vehicle to said grid this may only be done if the condition that all the sockets have either an electric plug or a blind plug received therein is fulfilled. Thus, before closing said switch a sensing action has to be carried out for each said socket to detect whether an electric plug or a blind plug is received therein, and when the first electric control unit 16 has received information about this sensing stating that the condition is fulfilled this will control the second control unit 17 of said station to close the switch 18 (or 42 in the DCV case).

Figure 6:
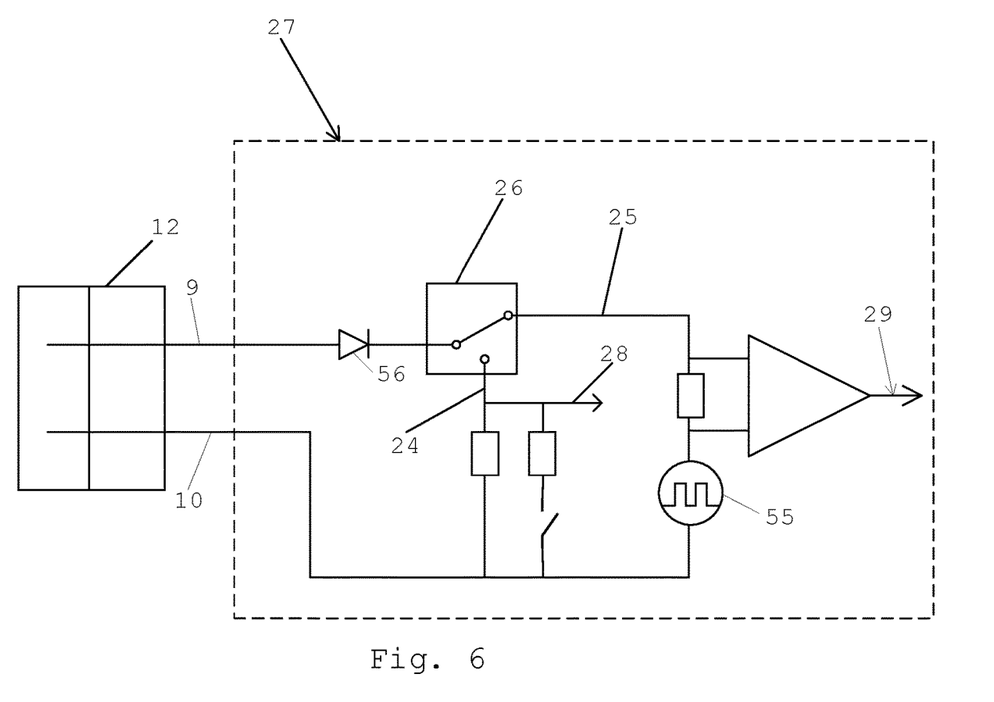
FIG. 6 is a very schematic view used to explain a method according to an embodiment of the invention.

FIG. 6 illustrates schematically how said sensing may be carried out. Two conducting loops are for that sake provided, which both will be closed by a plug, i.e. an electric plug or a blind plug, received in the socket in question. A first said conducting loop 24 is designed for determining whether an electric plug is received in the socket by measuring the current possibly flowing therein, whereas a second said conducting loop 25 is designed for determining whether a blind plug is received therein by measuring the current possibly flowing in that loop. This loop 25 requires for this a voltage source 55 which has to at least partly have a negative voltage so that the diode 56 between the socket 12 and the switch 26 will not block the current supply to the blind plug. It is an advantage if the voltage is not static but is varying, e.g. as a rectangular wave. This wave pattern may then be identified in the loop emitting the output signal 29, which increases the immunity to noise. It is shown how it may be chosen which one of said conducting loops is to be closed by a plug in the socket 12 by controlling a switch 26 arranged at an open location separate from the socket in question. The device 27 configured to sense presence of either an electric plug or a blind plug in each socket shown in FIG. 6 is accordingly configured to measure the current possibly flowing in the first and second conducting loops when closed for deciding that an electric plug is received in the socket when the value of the current measured in the first conducting loop is within a first predetermined interval and that a blind plug is received in the socket when the value of the current measured in the second conducting loop is within a second predetermined interval. The device 27 is configured to for each socket alternatingly sense whether an electric plug or a blind plug is received therein by controlling the switch 26 accordingly. The information about this sensing action is sent through outputs 28, 29 of each loop to the control unit 16 for being considered when controlling the switch 18 or 42 through the control unit 17. The resistor 57 of the conducting loops may be replaced by another component, e.g. a zener diode.

Figure 7:
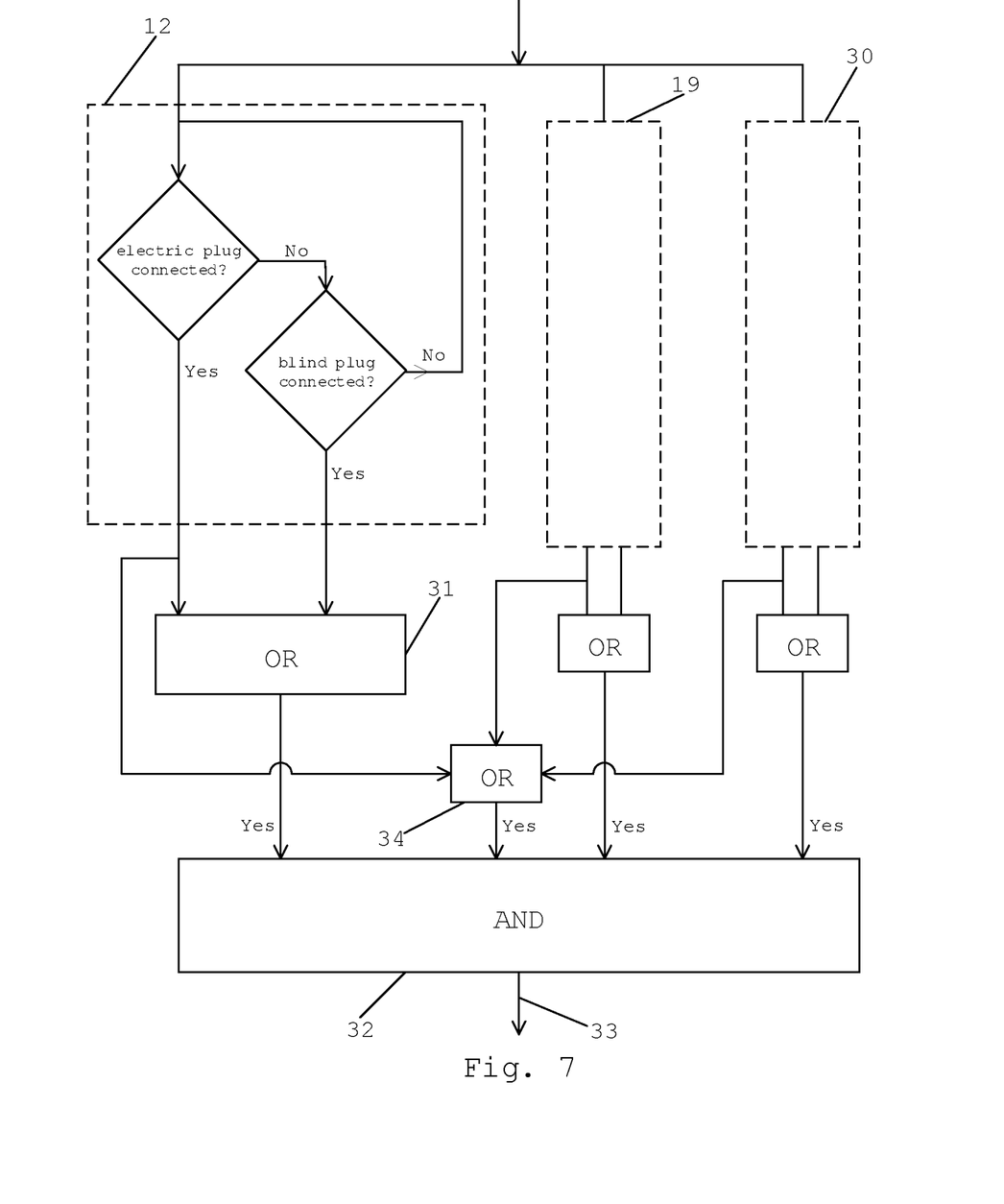
FIG. 7 is a schematic view used to explain some steps of a method according to the invention.

FIG. 7 illustrates schematically how it is determined whether said condition is fulfilled. It is shown how the electric system of the vehicle has three said sockets 12, 19, 30 and how it is alternatingly sensed whether an electric plug or a blind plug is received in the socket, and when the answer to this question is Yes an OR-gate 31 sends a Yes on the output to an AND-gate 32. The results of the sensing involving the first conducting loop are for all sockets sent to an OR-gate 34 sending a Yes further to the AND-gate when it has received at least one Yes. The AND-gate will accordingly send a logic 1 on the output 33 thereof to the control unit 16 for controlling the control unit 17 to close the switch 18 when a Yes has been received by the AND-gate from the sensing carried out for all the three sockets 12, 19 and 30 and at least one of them has an electric plug received therein.

Furthermore, means are provided for locking electric plugs and blind plugs received in the sockets before or simultaneously with the control of the switch 18 to close. Furthermore, it is ensured that no plug may be removed from any socket before opening the switch 18 or 42 and disconnecting the sockets from the AC or DC mains grid. In order to remove any plug from any socket the driver of the vehicle has to first of all request that the sockets used to transfer charging current to the electric batteries stop transferring charging current. This request may be obtained by pushing a button on the instrument panel of the vehicle or through a remote control. When the control unit 16 has received said request this will control the control unit 17 to open the switch 18 for interrupting the charging of the electric batteries 1 of the vehicle. When the control unit 16 has received information from the control unit 17 that the switch 18 has been opened the locking action in each socket will be released so that the driver may remove any of the plugs received in the sockets when desired.

Figure 8:
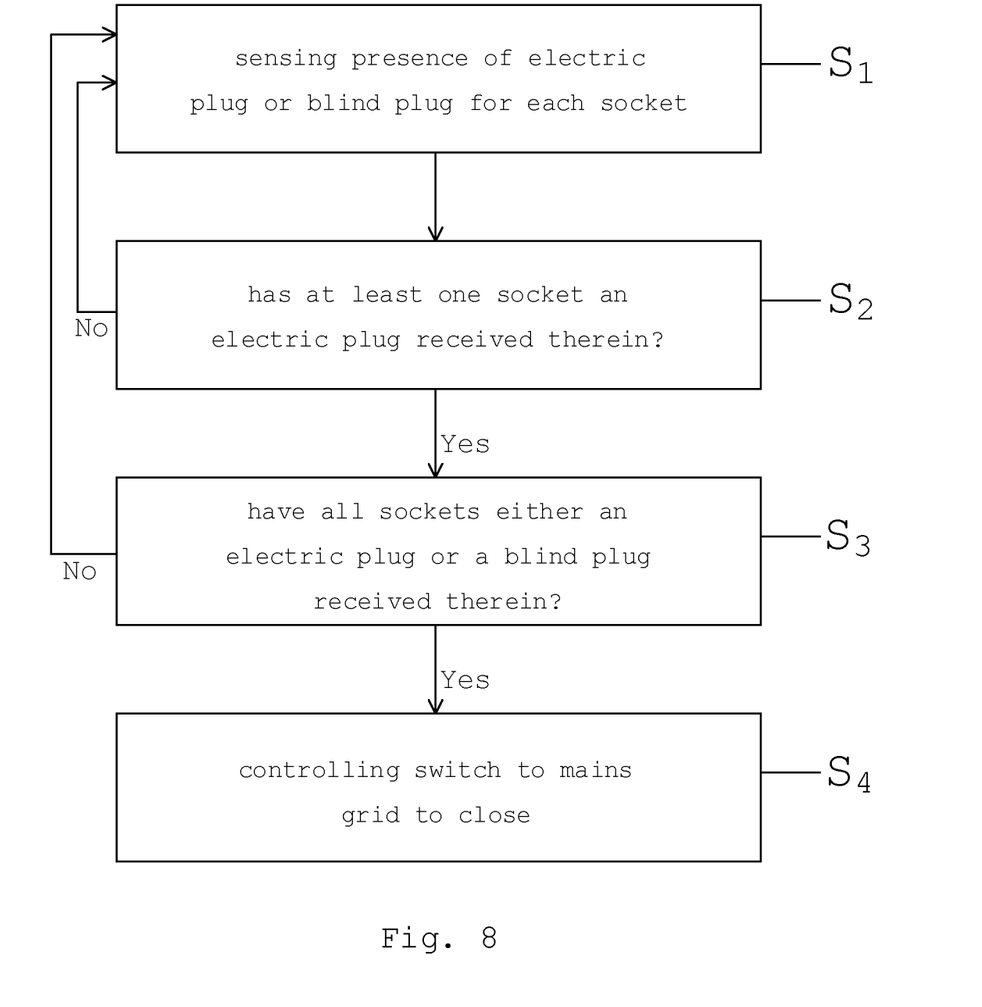
FIG. 8 is a flow chart illustrating the steps carried out in a method according to an embodiment of the invention.

FIG. 8 illustrates a flow chart of a method according to an embodiment of the present invention carried out for a hybrid or electrified vehicle, the batteries of which are to be charged. The method is started with a step $S_1$ of sensing presence of an electric plug or blind plug for each socket followed by a step $S_2$ of asking the question if at least one socket has an electric plug received therein. When the answer to this question is Yes it is continued with a step $S_3$ of asking the question whether all sockets have either an electric plug or a blind plug received therein. When the answer to this question is Yes the method is terminated by the step $S_4$ of controlling the switch to mains grid to close for starting the battery charging.

Figure 9:
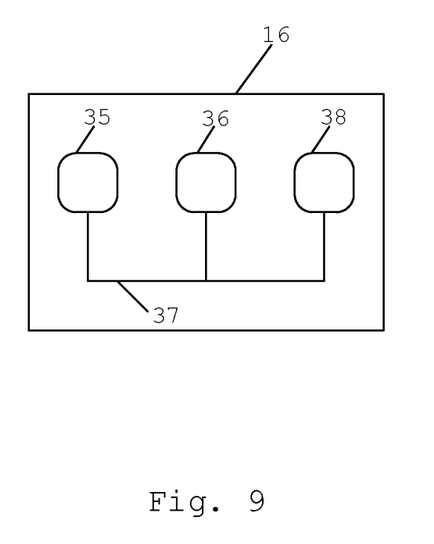
FIG. 9 illustrates schematically an electronic control unit according to the invention.

Computer program code for implementing a method according to the invention is with advantage included in a computer program which can be read into the internal memory of a computer, e.g. the internal memory of an electronic control unit of a motor vehicle. Such a computer program is with advantage provided via a computer program product comprising a data storage medium which can be read by a computer and which has the computer program stored on it. Said data storage medium is for example an optical data storage medium in the form of a CD ROM disc, a DVD disc etc., a magnetic data storage medium in the form of a hard disc, a diskette, a cassette tape etc., or a flash memory or a memory of the ROM, PROM, EPROM or EEPROM type. FIG. 9 illustrates very schematically an electronic control unit 16 comprising an execution means 35, e.g. a central processor unit (CPU), for execution of computer software. The execution means 35 communicates with a memory 36, e.g. of the RAM type, via a data bus 37. The control unit 12 comprises also a non-transitory data storage medium 38, e.g. in the form of a flash memory or a memory of the ROM, PROM, EPROM or EEPROM type. The execution means 35 communicates with the data storage medium 38 via the data bus 37. A computer program comprising computer program code for implementing a method according to the invention, e.g. in accordance with the embodiment illustrated in FIG. 8, is stored on the data storage medium 38.

The invention is of course in no way restricted to the embodiments described above, since many possibilities for modifications thereof are likely to be obvious to one skilled in the art without having to deviate from the scope of invention defined in the appended claims.

In the case of charging through an AC mains grid the number of AC phases may be one or three, such as one for private cars and three for heavy vehicles, such as trucks and buses.

The invention claimed is:

1. A method for preventing access to live parts in charging contact sockets of a hybrid or electrified vehicle having a plurality of such sockets each connectable to an external source of electric energy through a switch in an electric vehicle supply equipment station by inserting an electric plug in the socket for providing electric energy to batteries of the vehicle, in which a blind plug is insertable in each said socket, said sockets being connected to each other and to said batteries, said method for providing electric energy to said batteries after an electric plug has been inserted in at least one of said sockets, said method comprising:
   a) sensing, for each said socket, to detect whether a said electric plug or a said blind plug is received therein; and
   b) controlling said switch to be transferred to the closed position, under the condition that it has in step b) been detected that all said sockets have either a said electric plug or a said blind plug received therein and at least one of these plugs is a said electric plug, to connect said batteries to said external electric energy source.

2. A method according to claim 1, further comprising a step c) carried out before or simultaneously with step b) and comprising locking of electric plugs and blind plugs received in the sockets thereto.

3. A method according to claim 2, wherein step c) is performed upon detecting an electric plug received in a socket in step a).

4. A method according to claim 2 further comprising keeping electric plugs and blind plugs received and locked in the sockets locked thereto at least as long as said switch is in the closed position and requiring a transfer of the switch to the open position for disconnecting an electric plug received in a socket or removing a blind plug therefrom after providing said batteries with electric energy.

5. A method according to claim 2 further comprising releasing electric plugs and blind plugs received and locked in said sockets therefrom by a transfer of said switch to the open position to enable removal of said electric plugs and blind plugs from the sockets.

6. A method according to claim 1, wherein in step a) sensing whether an electric plug is received in a socket is performed by measuring a current, if any, flowing in a first conducting loop to be closed by an electric plug or a blind plug received in the socket.

7. A method according to claim 6 further comprising closing said conducting loop at an open location separate from said socket for carrying out said sensing in step a).

8. A method according to claim 1, wherein in step a) sensing whether a blind plug is received in a socket is performed by measuring a current, if any, flowing in a second conducting loop to be closed by an electric plug or blind plug received in the socket.

9. An arrangement for preventing access to live parts in charging contact sockets of a hybrid or electrified vehicle having a plurality of such sockets each connectable to an external source of electric energy through a switch in an electric vehicle supply equipment station by inserting an electric plug in the socket for providing electric energy to batteries of the vehicle, comprises blind plugs insertable into said sockets and said sockets are connected to each other and to said batteries, wherein the arrangement comprises:
   a device configured to sense presence of either an electric plug or a blind plug in each said socket; and
   a control unit configured to receive information from said device about said sensing and to control said switch to assume a closed position under the condition that presence of either a said electric plug or a said blind plug is sensed by the device for all said sockets of the vehicle and at least one of these plugs is a said electric plug to connect said batteries to said external electric energy source and otherwise keep said switch in the open position.

10. An arrangement according to claim 9, wherein said device is configured to, for each said socket, alternatingly sense whether an electric plug or a blind plug is received therein and when either an electric plug or a blind plug is received therein send a logic 1 to an AND-gate included in the arrangement and having the output thereof connected to said control unit, and that the control unit is configured to consider said condition fulfilled upon receiving a logic 1 from the output of said AND-gate.

11. An arrangement according to any of claim 9, wherein the device comprises for each socket a first conducting loop to be closed by an electric plug or a blind plug in the socket and means configured to measure a current, if any, flowing in the first conducting loop and to decide that an electric plug is received in the socket when the value of the current is within a first predetermined interval.

12. An arrangement according to claim 9, wherein the device comprises for each socket a second conducting loop to be closed by an electric plug or a blind plug received in the socket and means configured to measure a current, if any, flowing in the second conducting loop and decide that a blind plug is received in the socket when the value of the current measured is within a second predetermined interval.

13. An arrangement according to claim 9, wherein the control unit is a general electronic processor performing operations by running computer program code stored on a non-transitory computer-readable medium associated with the control device.

14. A computer program product comprising computer program code stored on a non-transitory computer-readable medium, said computer program product used for preventing access to live parts in charging contact sockets of a hybrid or electrified vehicle having a plurality of such sockets each connectable to an external source of electric energy through a switch in an electric vehicle supply equipment station by inserting an electric plug in the socket for providing electric energy to batteries of the vehicle, in which a blind plug is insertable in each said socket, said sockets being connected to each other and to said batteries, said computer program code for providing electric energy to said batteries after an electric plug has been inserted in at least one of said sockets, said computer program code comprising computer instructions to cause one or more electronic control units to perform the following operations:
  a) sensing, for each said socket, to detect whether a said electric plug or a said blind plug is received therein; and
  b) controlling said switch to be transferred to the closed position, under the condition that it has in step b) been detected that all said sockets have either a said electric plug or a said blind plug received therein and at least one of these plugs is a said electric plug, to connect said batteries to said external electric energy source.

15. An electronic control system used for preventing access to live parts in charging contact sockets of a hybrid or electrified vehicle having a plurality of such sockets each connectable to an external source of electric energy through a switch in an electric vehicle supply equipment station by inserting an electric plug in the socket for providing electric energy to batteries of the vehicle, in which a blind plug is insertable in each said socket, said sockets being connected to each other and to said batteries, said electronic control system comprising:
  one or more electronic control units;
  a non-transitory computer-readable medium; and
  computer program code stored on the non-transitory computer-readable medium, said computer program code comprising computer instructions to cause the one or more electronic control units to perform the following operations:
    a) sensing, for each said socket, to detect whether a said electric plug or a said blind plug is received therein; and
    b) controlling said switch to be transferred to the closed position, under the condition that it has in step b) been detected that all said sockets have either a said electric plug or a said blind plug received therein and at least one of these plugs is a said electric plug, to connect said batteries to said external electric energy source.

16. A hybrid or electrified vehicle having a plurality of charging contact sockets each connectable to an external source of electric energy through a switch in an electric vehicle supply equipment station by inserting an electric plug in the socket for providing electric energy to a batteries of the vehicle, in which a blind plug is insertable in each said socket and said sockets are connected to each other and to said batteries, wherein said vehicle comprises:
  a device configured to sense presence of either an electric plug or a blind plug in each said socket; and
  a control unit to receive information from said device about said sensing and to control said switch to assume a closed position under the condition that presence of either a said electric plug or a said blind plug is sensed by the device for all said sockets of the vehicle and at least one of these plugs is a said electric plug and otherwise keep said switch in the open position.

17. A vehicle according to claim 16, wherein the control unit is a general electronic processor performing operations by running computer program code stored on a non-transitory computer-readable medium associated with the control device.

* * * * *